United States Patent
Kuze

[19]

[11] Patent Number: 6,138,617
[45] Date of Patent: Oct. 31, 2000

[54] COOLING SYSTEM FOR AN AUTOMOTIVE ENGINE

[76] Inventor: Yoshikazu Kuze, No. 31-3, 1-chome, Higashimagome, Otka-ku, Tokyo, Japan

[21] Appl. No.: 09/146,575

[22] Filed: Sep. 3, 1998

[30] Foreign Application Priority Data

| Apr. 11, 1997 | [JP] | Japan | 9-127755 |
| Apr. 3, 1998 | [JP] | Japan | 10-128019 |
| Jun. 12, 1998 | [JP] | Japan | 10-201038 |
| Jun. 30, 1998 | [JP] | Japan | 10-219531 |

[51] Int. Cl.$^7$ .................................. F01P 7/14
[52] U.S. Cl. ........................ 123/41.1; 236/34.5
[58] Field of Search ............... 123/41.1, 41.49, 123/41.12; 236/34.5

[56] References Cited

U.S. PATENT DOCUMENTS

| 4,428,527 | 1/1984 | Daigler | 236/34.5 |
| 4,537,158 | 8/1985 | Saur | 123/41.1 |
| 4,630,770 | 12/1986 | Sliger et al. | 236/34.5 |
| 4,642,599 | 2/1987 | Saur | 337/397 |
| 4,679,530 | 7/1987 | Kuze | 123/41.1 |
| 4,765,284 | 8/1988 | Kanazawa et al. | 123/41.49 |
| 5,152,144 | 10/1992 | Andrie | 123/549 |
| 5,617,816 | 4/1997 | Saur et al. | 123/41.08 |
| 5,992,755 | 11/1999 | Kuze | 236/34.5 |

FOREIGN PATENT DOCUMENTS 02196994  8/1990  Japan .

*Primary Examiner*—Noah Kamen
*Attorney, Agent, or Firm*—Niiles & Niiles SC

[57] ABSTRACT

A cooling system has a radiator for cooling coolant of an automotive engine, cooling fan for cooling the coolant in the radiator, and a thermostat for controlling coolant temperature. The thermostat has a housing having a flange, an actuating rod secured to the housing at a first end thereof, a guide member slidably mounted on the actuating rod, a resilient seal spool provided around a second end portion of the actuating rod and secured to the guide member, a heat sensitive cylinder housing the seal spool and secured to the guide member, wax pellets provided in the heat sensitive cylinder to enclose the seal spool. The flange has a hole so as to pass a coolant, and the thickness of the resilient seal spool being set between 25% and 5% of the diameter of the actuating rod, thereby reducing a spring constant of a return spring of the thermostat. A cooling fan switch is provided for starting the cooling fan at a low coolant temperature.

1 Claim, 12 Drawing Sheets

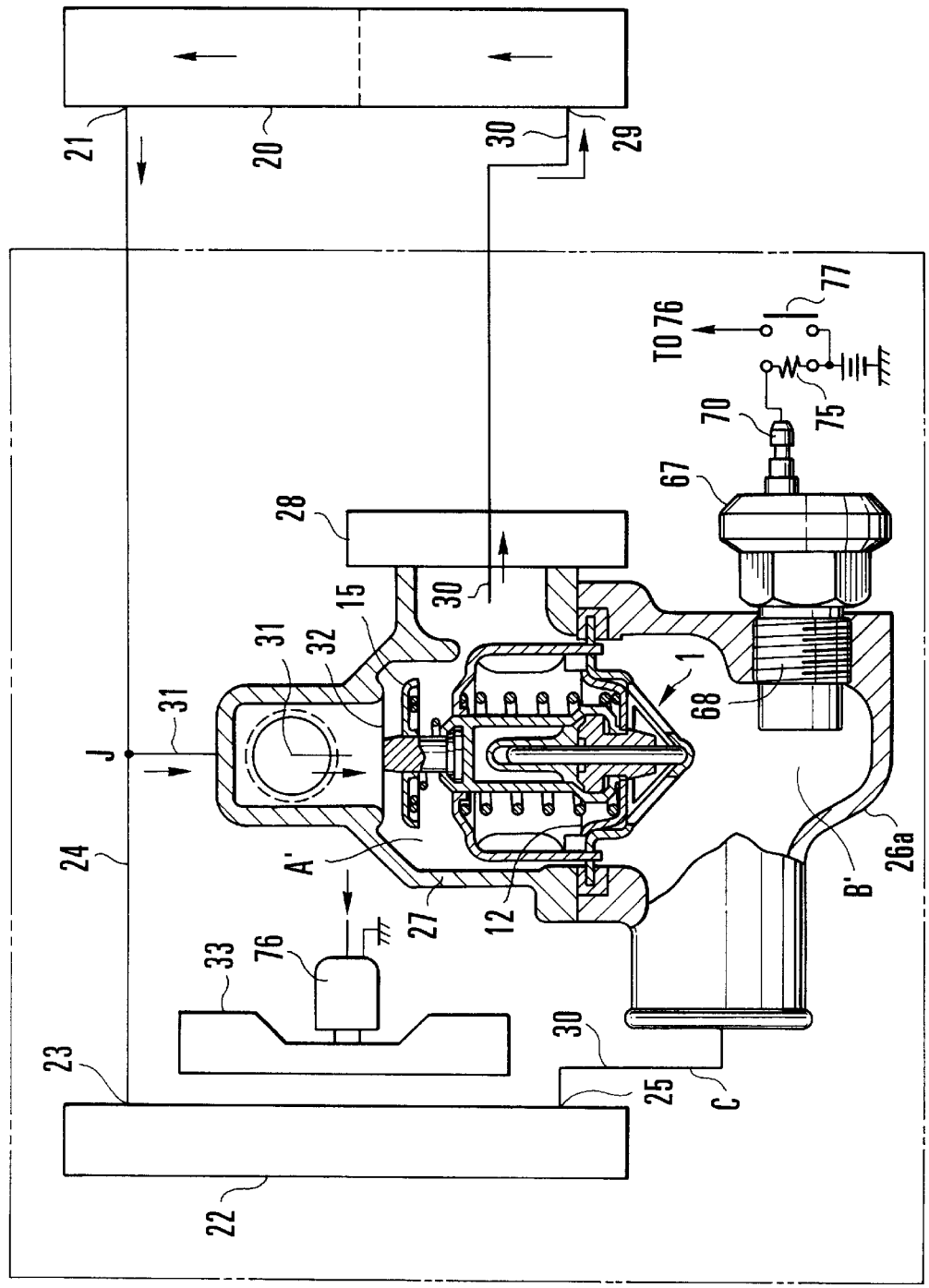

COOLING SYSTEM FOR AN AUTOMOTIVE ENGINE

BACKGROUND OF THE INVENTION

The present invention relates to a cooling system for controlling temperature of a coolant of an automotive engine.

Referring to FIG. 6 showing a conventional cooling system for an automotive engine, the system has a thermostat 1 which is disposed in an inlet side passage of water jackets 20.

The cooling system comprises a first coolant passage 24 disposed between an upper outlet 21 of the water jackets 20 and an upper inlet 23 of a radiator 22, and a second coolant passage 30 provided between a lower outlet 25 of the radiator 22 and a lower inlet 29 of the water jackets 20, including a thermostat cap 26, a thermostat housing 27 and a water pump 28. A bypass passage 31 is provided between a junction J of the first passage 24 and the thermostat housing 27 so as to communicate the first passage 24 with the second passage 30 without passing the radiator 22. The thermostat 1 is hermetically secured to the housing 27 by the thermostat cap 26. The thermostat 1 has a main valve 12 for closing the second passage 30 and a bypass valve 15 for closing a bypass port 32 of the bypass passage 31.

In FIG. 6, the reference A' designates a measuring point for measuring the temperature of the coolant in the housing 27, and B' designates a measuring point provided in the second passage 30 adjacent to the thermostat cap 26 and upstream of the thermostat 1 for measuring the temperature of the coolant in the second passage 30. The reference C designates a measuring point for measuring the flow rate of the coolant in the second passage 30. The reference numeral 33 designates a cooling fan.

The thermostat 1 is operated by a thermo-actuator. The thermo-actuator comprises an actuating steel rod and a resilient seal spool which is slidably engaged with the rod. The seal spool is inserted in a heat sensitive cylinder filled with wax pellets.

As shown in FIG. 7, a perforation 19a is formed in a flange 16 of the thermostat 1, and a jiggle valve mechanism 17 having a jiggle valve 18 is movably engaged in the perforation 19a.

During the operation of the engine, the jiggle valve 18 is closed by the pressure of the coolant in the second coolant passage 30 as shown in FIG. 7. When the engine stops, the jiggle valve opens. Thus, the coolant can be supplemented in the direction of the arrow.

During the cold engine state, the main valve 12 of the thermostat 1 is closed as shown in FIG. 6, and the jiggle valve 18 is also closed by the coolant pressure, while the bypass valve 15 integrated with the main valve 12 is fully opened. Thus, the coolant drawn from the outlet 21 of the water jackets 20 does not pass through the radiator 22. The coolant is circulated by the water pump 28 through the junction J of the first passage 24, bypass passage 31, housing 27, and inlet 29 of the water jackets 20 as indicated by arrows. Thus, the temperature of the coolant in the housing 27 quickly rises.

However, since the coolant in the radiator 22 and the thermostat cap 26 is not circulated, the temperature rising rate of the coolant temperature B therein is slow. Therefore, as shown in a record of FIG. 8, after even if the temperature A at the point A' becomes 87° C. which is an opening temperature of the main valve 12, the temperature B at the point B' is merely 45° C. There is a difference of 42° C. between the temperatures A and B.

When the main valve 12 of the thermostat 1 opens, the coolant of a low temperature is drawn from the lower outlet 25 of the radiator 22 and fed to the thermostat housing 27 through the second passage 30. Consequently, the temperature B of the coolant at the point B' is further lowered by 13° C. As a result, the difference between the temperature B of the coolant in the passage 30 and the temperature A of the coolant in the housing 27 increases to 55° C. The area of the part shown by the hatching indicates energy loss in the period. It will be understood that the time of the abscissa indicates the elapse from the time at 60° C. of the temperature A. Since the heat sensitivity of the thermostat 1 is low, the response of the thermostat delays with respect to the change of the coolant temperature. Therefore, the main valve 12 opens after the temperature has become considerably higher than the predetermined opening temperature 87° C. When the main valve 12 opens, the temperature of the coolant is lowered. The main valve 12 closes after the coolant temperature has considerably decreased lower than a predetermined closing temperature. Then, the coolant temperature rises. Namely, there is a large heat overshoot in control of the coolant temperature, so that the main valve is repeatedly opened and closed. When the main valve 12 closes, a surge pressure occurs at the upstream of the main valve.

The heat overshoot causes cracks of the cylinder block and cylinder head of the engine, and the surge pressure causes breakdown of the thermostat 1 and the radiator 22.

Since, mentioned in above, the jiggle valve mechanism is sources of energy loss and engine troubles, the jiggle valve mechanism is removed from the present thermostat. And a small hole is formed in the flange of the thermostat. Therefore, pressures applied to the outer side and inner side of the main valve become equal to each other. The spring constant of the return spring is reduced. As a result, the lift up rate is increased in a low temperature range. Furthermore, the thickness of the seal spool is extremely thin (thickness of between 25% and 5% of the diameter of the actuating rod), so that the pressure of the wax for the lift up of the valve is reduced.

FIG. 1 is a diagram showing the lift with respect to the coolant temperature. A line X is the lift of the valve of the present invention and the line Y is the lift of the conventional valve. The range of the steep curve line is the solid wax state.

The main valve of the conventional valve Y opens at 72° C., the lift at the end temperature 87° C. of the solid wax state is merely 9.6 mm. Thereafter, the lift up rate reduces because of the liquid wax state, and when the lift becomes 12 mm, the coolant temperature reaches such a high temperature as 123° C.

The main valve of the present invention also opens at 72° C., the lift becomes 6 mm by a small temperature increase of 9° C. When the lift reaches 12 mm, the coolant temperature is 85° C. as shown by the line X, which is only increase of 4° C. The coolant temperature of 85° C. is within the range of the solid wax state.

When the automobile mounting the thermostat of the present invention is driven at 80 Km/h, the coolant temperature increases to 77.5° C. However, when the speed reaches to 150 Km/h, the coolant temperature decreases to 70.5° C., because the radiator is cooled by a strong wind. Therefore, the cooling system using the thermostat of the present invention is provided such that the cooling fan switch is closed to start the cooling fan at an upper limit temperature of 81° C.

The line Z'–Z of FIG. 1 shows the upper limit of 81° C. The hatched area shows the difference between the flow rate of the coolant passing the main valve of the present invention and the flow rate in the conventional valve. The lift of the line X at 81° C. is 6 mm and the lift of the line Y is 3 mm. Therefore, the flow rate of X is two times as much as the flow rate of Y.

The flow rate at the lift of 6 mm of X which is in the solid wax state corresponds to the flow rate at the lift of 12 mm of Y which is included in the liquid wax state. Thus, the thermostat of the present invention uses only 50% of the own power at the lift of 12 mm. Therefore, even if an automobile mounting the thermostat of the present invention is driven at 150 Km/h, there remains the power of 50%.

However, the conventional thermostat of the line Y enters the liquid wax state range after 86° C. (lift 9.3 mm), where the lift increasing rate largely decreases. The coolant temperature of 37° C. (123° C.–86° C.) is consumed in vain in the period from the lift 9.3 to 12 mm. The thermostat of the present invention demonstrates a double power with half of source, remaining power of 50%.

The coolant flowing through a small hole on the flange needs not worry about taking a longer warm up period for a idling because the cold start fuel injector is provided in the throttle body controlled by a computer compensate a time loss for idling.

In the cooling system, the fan switch of the present invention is linked to the thermostat, when the coolant temperature reaches 81° C., the cooling fan operates. Since the flow rate of the coolant at 81° C. is the double of that of the conventional thermostat, the coolant temperature quickly decreases. Therefore, the coolant temperature is kept 81° C.

The upper limit for the cooling fan is not limited to 81° C. It is desirable to set the temperature to an effective value as low as possible dependent on tests.

The high coolant temperature of the conventional thermostat causes various problems such as an increase of fuel consumption and aggravation of the emission.

SUMMARY OF THE INVENTION

An object of the present invention is to provide a cooling system having a wax type thermostat a main valve of which has double flow rate of the conventional thermostat, thereby increasing the thermal efficiency of the automotive engine.

In addition, a cooling fan switch is provided to be closed at a coolant temperature below 81° C. for starting a cooling fan, thereby largely lowering an upper limit temperature of the coolant to an extremely low temperature.

According to the present invention, there is provided a cooling system for an automotive engine comprising, a radiator for cooling a coolant of the engine, a cooling fan for cooling the coolant in the radiator, a thermostat having a housing having a flange for attaching thereof to a conduit member, an actuating rod secured to the housing at a first end thereof, a guide member slidably mounted on the actuating rod, a resilient seal spool provided around a second end portion of the actuating rod and hermetically secured to the guide member, a heat sensitive cylinder housing the seal spool and secured to the guide member, wax pellets provided in the heat sensitive cylinder to enclose the seal spool, a lubricant oil provided in a space between the seal spool and the actuating rod, a main valve provided on the guide member, and a return spring for urging the main valve to a valve seat formed on the flange, the improvement comprising, the flange having at least one hole so as to pass a coolant, resulting the spring constant of return spring is reduced and thickness of the resilient seal spool set between 25% and 5% of the diameter of the actuating rod, and a cooling fan switch for starting the cooling fan at a coolant temperatures below 81° C.

These and other objects and features of the present invention will become more apparent from the following detailed description with reference to the accompanying drawings.

BRIEF DESCRIPTION OF DRAWINGS

FIG. 12 is a schematic diagram showing a cooling system according to the present inventions

DETAILED DESCRIPTION OF THE PREFERRED EMBODIMENT

Figure 2:
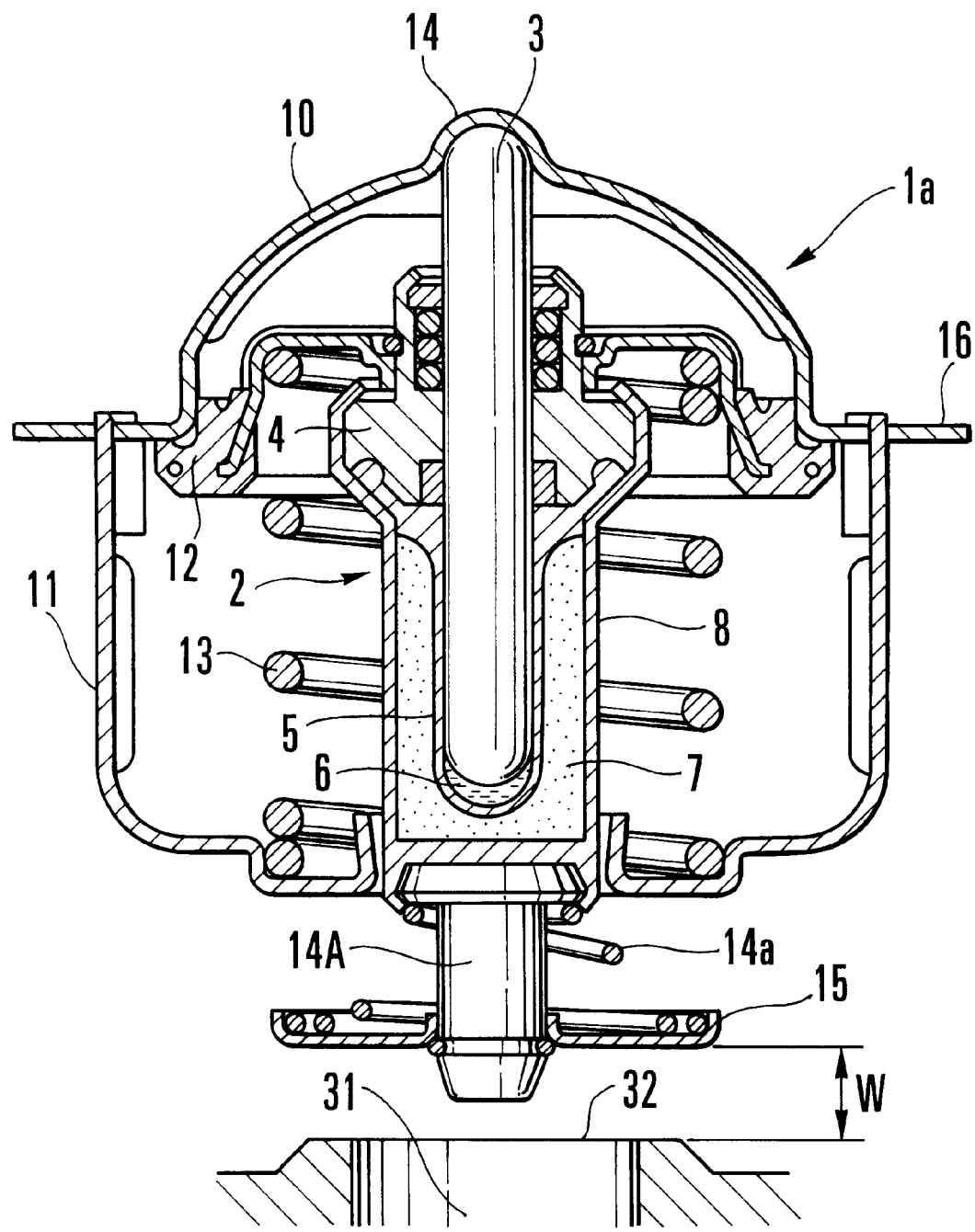
FIGS. 2 and 3 are sectional side views of the thermostat of the present invention.
Figure 3:
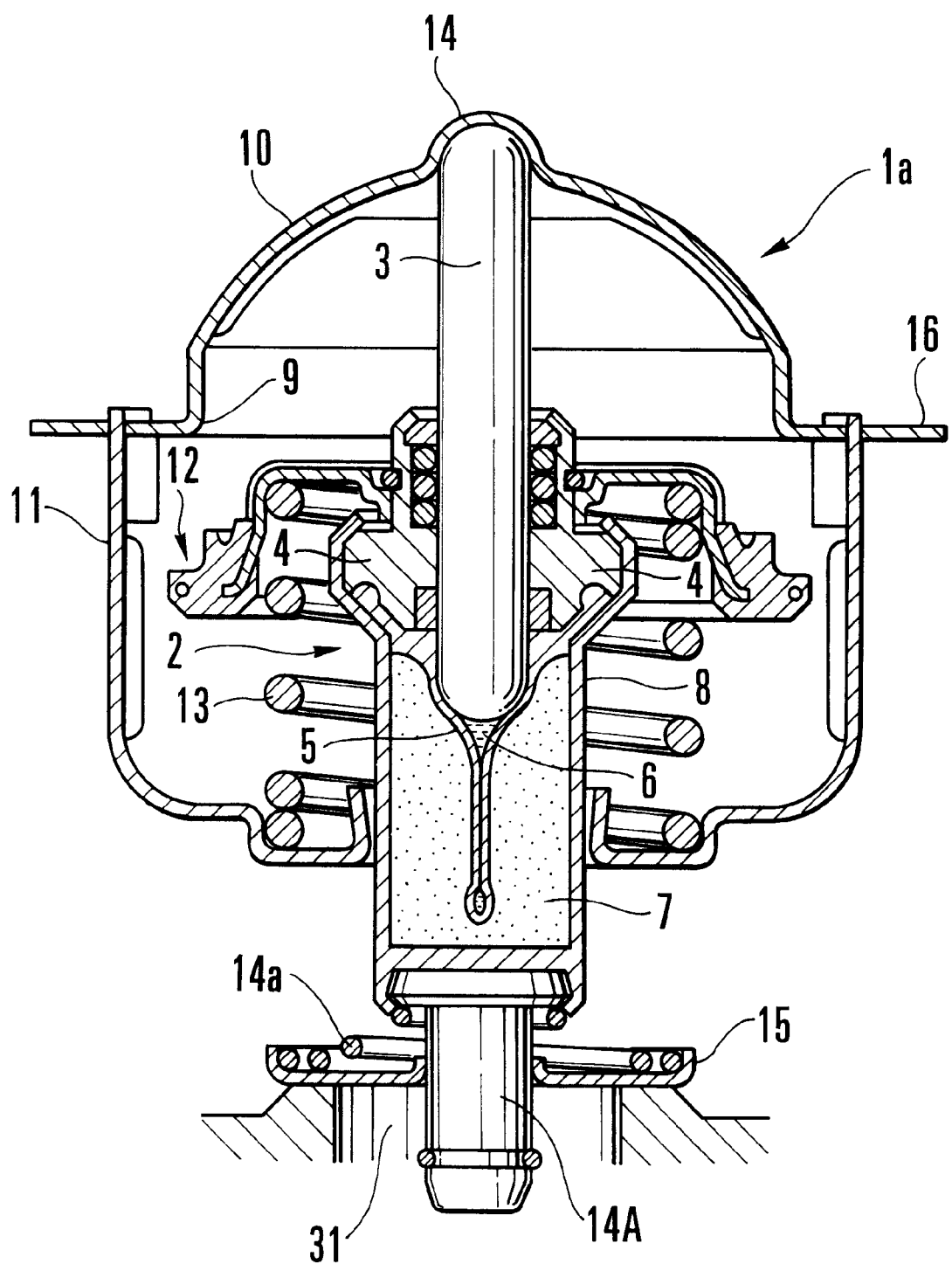

FIG. 2 shows a main valve closing state, and FIG. 3 shows a main valve opening state. A thermostat 1a of the present invention has a housing 10 forming a valve seat 9 (FIG. 3), a frame 11 secured to a flange 16 of the housing 10.

A thermo-actuator 2 comprises an actuating steel rod 3, a guide member 4 slidably mounted on the rod 3, and a resilient seal spool 5 which is hermetically secured to the guide member 4 and slidably engaged with the rod 3. The thickness of a bag portion of the seal spool 5 is between 25% and 5% of the diameter of the rod 3. A lubricating oil 6 fills the space between the seal spool 5 and the rod 3.

The seal spool 5 is inserted in a heat sensitive cylinder 8 filled with wax pellets 7. An end of the cylinder 8 is securely engaged with the guide member 4, thereby forming the thermo-actuator 2.

Figure 4:
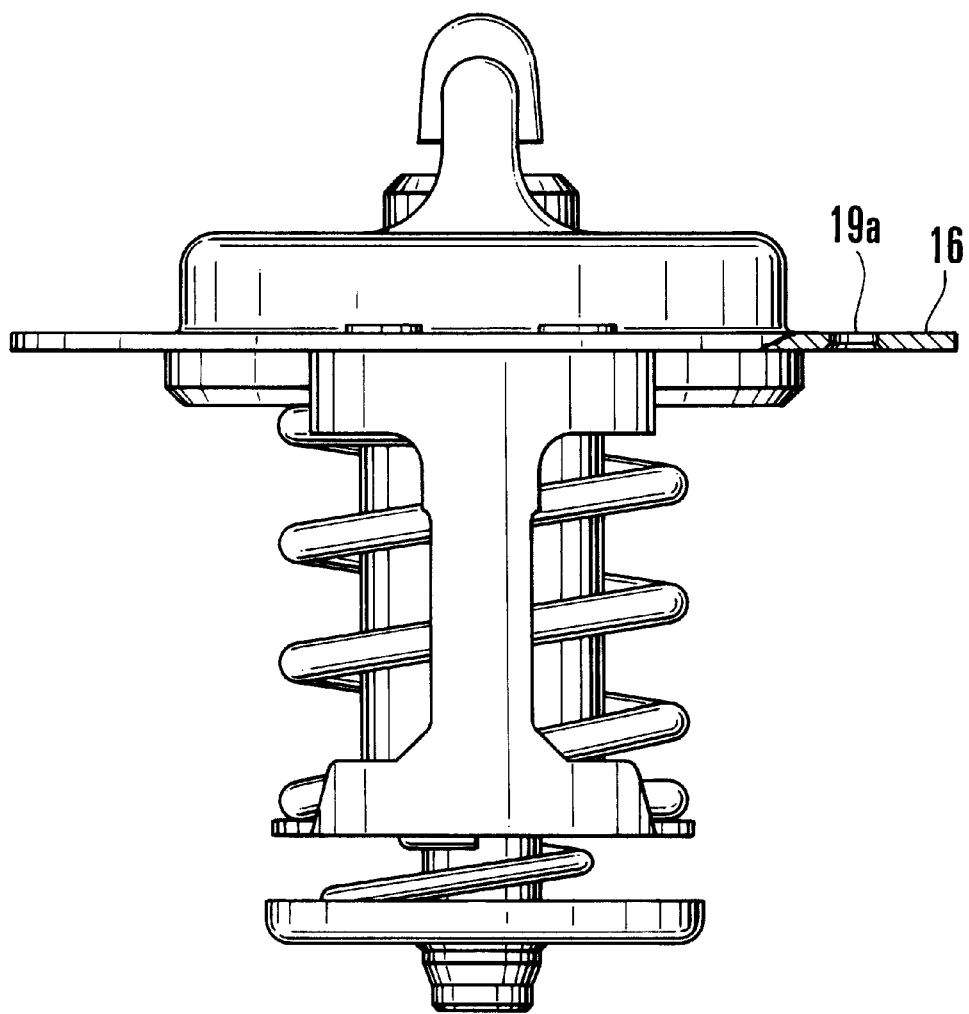
FIG. 4 is a side view of the thermostat of the present invention.

The rod 3 of the thermo-actuator is secured to the housing 10 at a top portion 14, and the main valve 12 is secured to the guide member 4. A return coil spring 13 disposed surrounding the cylinder 8 is provided between the main valve 12 and the bottom of the frame 11. A bypass valve 15 is slidably mounted on a shaft 14A secured to the cylinder 8 and resiliently held on the shaft 14A by a spiral spring 14a. The flange 16 has a hole 19a (FIG. 4) for communicating the space (A' of FIG. 12) in the thermostat housing with the passage (B' of FIG. 12) in the thermostat cap. The diameter of the hole 19a is determined to a value so that the pressure of the coolant in the outer side passage of the main valve 12 (second passage 30 of FIG. 12) becomes equal to the pressure to the coolant in the inner side passage, namely in the housing 10.

As a result, the spring constant of the return spring 13 can be reduced to a half of that of the conventional spring.

FIG. 2 shows the main valve in the close state. When the temperature of the coolant rises in excess of a predetermined value of the thermostat, the wax 7 in the heat conductive cylinder 8 expands. This forces the seal spool 5 against the rod 3. Since the rod 3 is secured to the housing 10, the cylinder 8 is downwardly moved against the force of the spring 13, thereby opening the main valve 12, and closing the bypass port 32 with the bypass valve 15 (FIG. 3).

When the coolant temperature decreases, the wax contracts. Thus, the coil spring 13 causes the main valve 12 to move to the closed position.

The operating range of the thermostat with respect to the temperature of the wax 7 is divided into a large lift up range of the main valve and a small lift up range. In the large lift up range, the wax is in the solid state where the volume of the wax largely changes. In the small lift up range, the wax is in the liquid state where the volume of the liquid wax changes at a small rate.

In order to increase the thermal efficiency of the automotive engine, it is necessary to increase the valve lift up rate with respect to the coolant temperature, thereby reducing an upper limit of the coolant temperature.

In the thermostat of the present invention, the thickness of the seal spool is extremely thin (thickness of between 25% and 5% of the diameter of the rod 3), so that the pressure of the wax for the lift up of the valve is reduced. Furthermore, a small hole (19a) is formed in the flange of the thermostat, so that pressures applied to the outer side and inner side of the main valve become equal to each other. Therefore, the spring constant of the return spring is reduced. As a result, the lift up rate is increased in a low temperature range.

Figure 1:
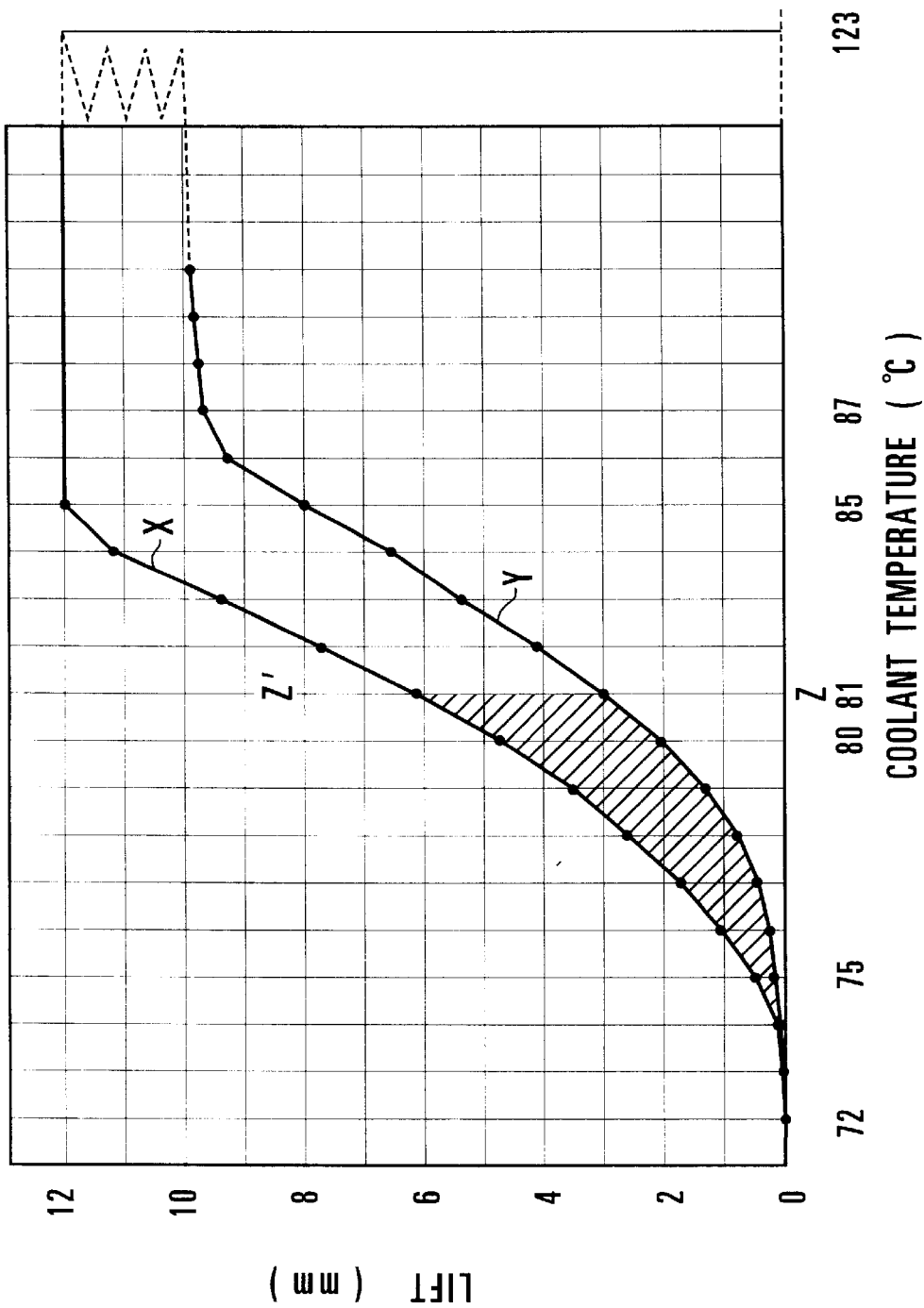
FIG. 1 is a graph showing changes of a lift of a valve in a thermostat of the present invention and a lift of a conventional valve with respect to temperature.

As set forth above, the main valve of the present invention opens at 72° C. When the lift reaches 12 mm, the coolant temperature is 85° C. as shown by the line X in FIG. 1.

The flow rate at the lift of 6 mm of X which is in the solid wax state corresponds to the flow rate at the lift of 12 mm of Y which is included in the liquid wax state. Thus, the thermostat of the present invention uses only 50% of the own power at the lift of 12 mm. Therefore, even if an automobile mounting the thermostat of the present invention is driven at 150 Km/h, there remains the power of 50%.

Since the flow rate of the coolant at 81° C. is the double of that of the conventional thermostat, the coolant temperature quickly decreases. Therefore, the coolant temperature is kept 81° C.

Figure 5:
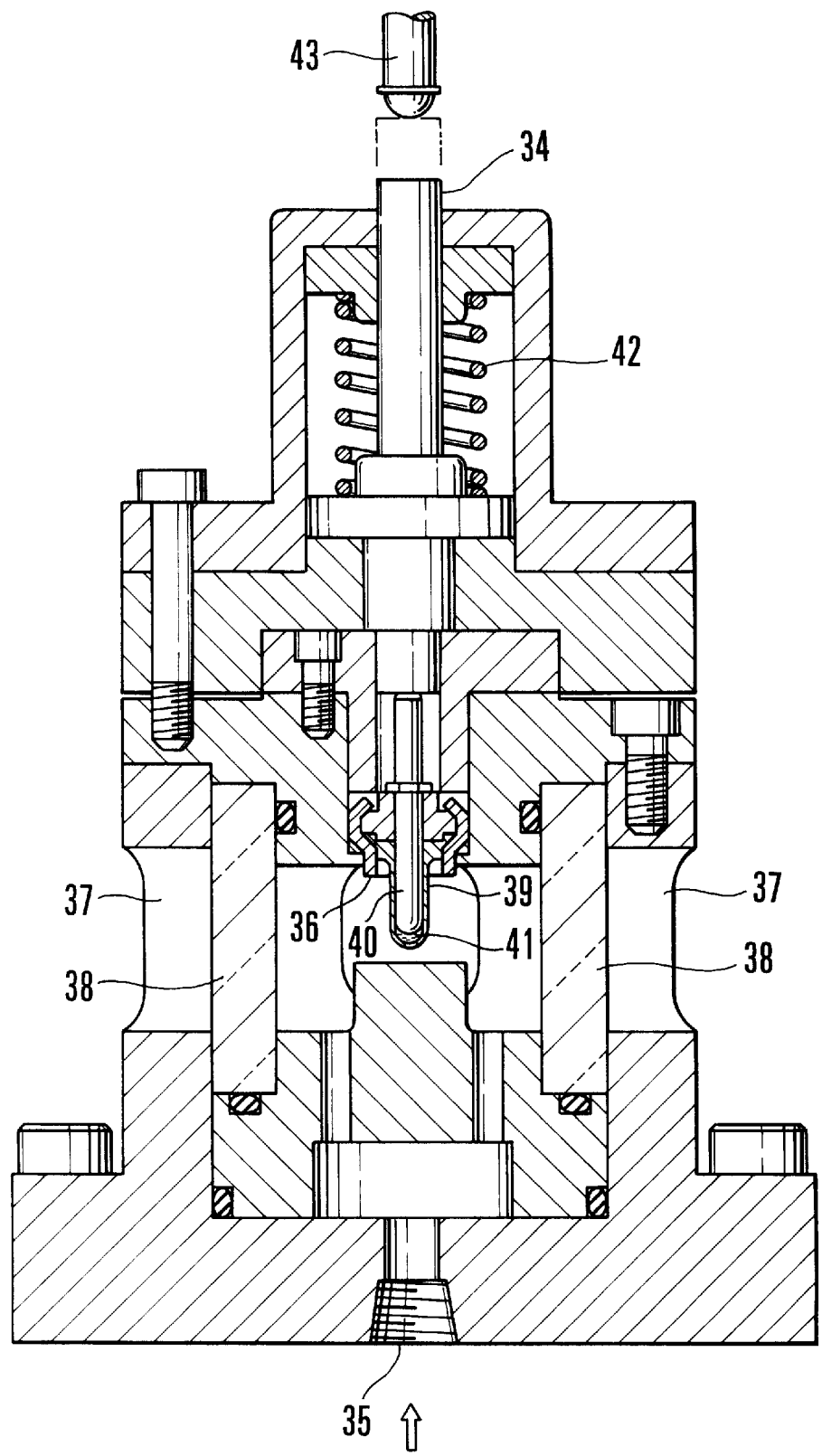
FIG. 5 shows a sectional view showing a test machine for a valve lift.

FIG. 5 shows a test machine for measuring the lift of the main valve with respect to the pressure applied to the seal spool. In the machine, oil pressure is used instead of wax pressure.

A thermo-actuator 36 is attached in the test machine, cutting the heat sensitive cylinder so as to observe a resilient seal spool 39. The space between the seal spool 39 and a rod 40, is fitted with a lubricating oil 41. The seal spool 39 can be observed through openings 37 and a transparent plastic pipe 38. The test machine has a slidable rod 34 downwardly urged by a spring 42. The top of the rod 34 contacts with a rod 43 of a dial indicator (not shown). The oil is supplied from an inlet 35.

Table 1 shows actually measured values for the relation between oil pressure and the lift of the main valve by the test machine of FIG. 5.

TABLE 1

| | PRESSURE-LIFT | | |
|---|---|---|---|
| PRESSURE $Kg/cm^2$ | THERMO-ACTUATOR (A) LIFT mm | THERMO-ACTUATOR (B) LIFT mm | THERMO-ACTUATOR (C) LIFT mm |
| 0 | 0 | 0 | 0 |
| 10 | 0 | 0 | 0 |
| 20 | 0 | 0 | 0 |
| 30 | 0 | 0 | 0 |
| 40 | 0 | 0 | 0 |
| 50 | 0 | 0.4 | 0.4 |
| 60 | 0 | 1.5 | 2.6 |
| 70 | 0 | 2.8 | 5.0 |
| 80 | 0.6 | 6.2 | 7.8 |
| 90 | 1.6 | 9.5 | 10.0 |

TABLE 1-continued

| | PRESSURE-LIFT | | |
|---|---|---|---|
| PRESSURE $Kg/cm^2$ | THERMO-ACTUATOR (A) LIFT mm | THERMO-ACTUATOR (B) LIFT mm | THERMO-ACTUATOR (C) LIFT mm |
| 100 | 2.5 | 10.0 | |
| 110 | 5.5 | | |
| 120 | 8.0 | | |
| 130 | 9.5 | | |
| 140 | 10.0 | | |

SPRING CONSTANT OF RETURN SPRING: 0.55 Kg/mm

In the table 1, a thermo-actuator (A) has rod 3 of 3.8 mm diameter and seal spool 5 of 1.7 mm thickness (45% of the diameter), a thermo-actuator (B) has the rod of 4.5 mm diameter and the seal spool of 1.25 mm (25%), and a thermo-actuator (C) has the rod of 4.5 mm diameter, and the seal spool of 0.225 mm (5%). The spring constant of the return spring 13 is 0.55 Kg/mm.

If the thickness of the seal spool 5 is extremely thin as the thermo-actuator (C), the pressure of the lubricant oil 6 in the seal spool becomes equal to the pressure of the lubricant oil 41. Since the resilient seal spool is in a floating state held by inner and outer equal pressures, the frictional resistance between the seal spool and the rod becomes zero. The rod 3 is relatively lifted up by the pressure of lubricant oil 41 applied to the lower end face of the rod.

Since the thermo-actuator (A) has a large thickness of 1.7 mm, the lift is 0.6 mm at the starting pressure of 80 $Kg/cm^2$. In order to lift the rod 10 mm against the spring load 15.1 Kg, the pressure of 140 $Kg/cm^2$ is necessary, which is out of the question.

Although the starting pressure for the rod 3 is 50 $Kg/cm^2$ for both the thermo-actuators (B) and (C) and the lift is the same 0.4 mm, the rod of (C) is lifted up 10 mm by the pressure of 90 $Kg/cm^2$ because of extremely small thickness 0.225 mm. But for (B), the large pressure of 100 $Kg/cm^2$ is necessary.

If the thickness of the seal spool 5 exceeds the thickness of (B), the starting pressure becomes larger than 50 $Kg/cm^2$. Therefore, the upper limit of the thickness is 25% of the diameter of the rod 3.

The thickness of the seal spool of the thermo-actuator (C) is sufficient. If the thickness becomes smaller, it is difficult to manufacture such a thin seal spool, and the manufacturing cost increases. Therefore, the lower limit of the thickness is 5% of the diameter of the rod 3.

Table 2 shows actually measured values.

TABLE 2

| | PRESSURE- LIFT |
|---|---|
| PRESSURE $Kg/cm^2$ | THERMO-ACTUATOR (D) LIFT mm |
| 0 | |
| 10 | |
| 20 | |
| 30 | 0.3 |
| 40 | 4.0 |
| 50 | 9.5 |
| 60 | 13.5 |

SPRING CONSTANT OF RETURN SPRING: 0.27 Kg/mm

A thermo-actuator (D) has the same rod diameter and seal spool thickness as the thermo-actuator (C), but the spring constant is reduced from the conventional value of 0.55 kg/mm to 0.27 kg/mm which is a half of the conventional value.

The rod is lifted up 0.3 mm at the starting pressure 30 kg/cm$^2$, and 13.5 mm at the pressure 60 kg/mm$^2$. By reducing the thickness of the resilient seal spool to an extremely small value and reducing the spring constant to a half of conventional value, liquefaction of the wax is promoted, so that the amount of the liquefied wax rapidly increases, thereby rapidly lifting up the main valve by the preeminent synergistic effect of the small thickness of the seal spool and the small spring constant.

Since the thermostat of the present invention operates at 50 percent of own full power, it operates calmly and quickly, so that the engine operates at small vibration and the life of the engine is extended.

Table 3 shows results of endurance tests of four thermostats of the present invention, and Table 4 shows results of endurance test of four conventional thermostats.

TABLE 3

| No. | CYCLE 340 SEC. | VALVE OPEN TEMP. ° C. | LIFT mm AT 98° C. | DIFFERENCE FROM INITIAL STAGE | |
| --- | --- | --- | --- | --- | --- |
| | | | | VALVE OPEN TEMP. | LIFT |
| 1 | 0 | 87.2 | 10.74 | | |
| | 10,000 | 86.8 | 10.78 | -0.4 | +0.04 |
| | 20,000 | 86.3 | 10.77 | -0.9 | +0.03 |
| | 30,000 | 85.8 | 10.76 | -1.4 | +0.02 |
| | 40,000 | 86.9 | 10.77 | -0.3 | +0.03 |
| 2 | 0 | 86.5 | 11.01 | | |
| | 10,000 | 86.0 | 11.02 | -0.5 | +0.01 |
| | 20,000 | 85.8 | 11.00 | -0.7 | -0.01 |
| | 30,000 | 86.0 | 11.02 | -0.5 | +0.01 |
| | 40,000 | 86.6 | 11.00 | +0.1 | -0.01 |
| 3 | 0 | 87.4 | 10.57 | | |
| | 10,000 | 87.2 | 10.63 | -0.2 | +0.06 |
| | 20,000 | 87.2 | 10.70 | -0.2 | +0.13 |
| | 30,000 | 86.6 | 10.66 | -0.8 | +0.09 |
| | 40,000 | 86.5 | 10.64 | -0.9 | +0.07 |
| 4 | 0 | 86.6 | 11.09 | | |
| | 10,000 | 85.6 | 11.12 | -1.0 | +0.03 |
| | 20,000 | 85.6 | 11.16 | -1.0 | +0.07 |
| | 30,000 | 85.8 | 11.14 | -0.8 | +0.05 |
| | 40,000 | 86.4 | 11.16 | -0.2 | +0.07 |

TABLE 4

| No. | CYCLE 340 SEC. | VALVE OPEN TEMP. ° C. | LIFT mm AT 98° C. | DIFFERENCE FROM INITIAL STAGE | |
| --- | --- | --- | --- | --- | --- |
| | | | | VALVE OPEN TEMP. | LIFT |
| 1 | 0 | 80.6 | 8.05 | | |
| | 10,000 | 81.0 | 8.27 | +0.4 | +0.22 |
| | 20,000 | 80.9 | 8.26 | +0.3 | +0.21 |
| | 30,000 | 80.3 | 8.29 | -0.3 | +0.24 |
| | 40,000 | 79.8 | 8.46 | -0.8 | +0.41 |
| 2 | 0 | 81.0 | 8.13 | | |
| | 10,000 | 82.0 | 8.13 | +1.0 | 0 |
| | 20,000 | 80.6 | 8.45 | -0.4 | +0.32 |
| | 30,000 | 80.4 | 8.16 | -0.6 | +0.03 |
| | 40,000 | 80.6 | 8.45 | -0.4 | +0.32 |
| 3 | 0 | 82.7 | 7.75 | | |
| | 10,000 | 82.5 | 7.85 | -0.2 | +0.10 |
| | 20,000 | 82.1 | 7.78 | -0.6 | +0.03 |
| | 30,000 | 82.7 | 7.45 | 0 | -0.30 |
| | 40,000 | 81.5 | 7.80 | -1.2 | +0.05 |
| 4 | 0 | 76.8 | 9.00 | | |
| | 10,000 | 78.3 | 8.93 | +1.5 | -0.07 |
| | 20,000 | 78.5 | 8.60 | +1.7 | -0.40 |
| | 30,000 | 81.5 | 7.95 | +4.7 | -1.05 |
| | 40,000 | 82.6 | 8.07 | +5.8 | -0.93 |

Each of the test was performed 40,000 times by alternating a first test and a second. In the first test, a coolant of below 40° C. flows 120 sec., and in the second test, coolant of over 98° C. flows 220 sec.

The most important factor for the durability of the thermostat is the variation value of the lift. The variation of the present invention is much smaller than the conventional variation over one figure. The difference between the lift at the initial stage and that of the final stage is almost zero.

By applying the following improvement to the thermostat of the present invention, it is possible to further increase the effect of the thermostat.

If the thickness of the resilient seal spool is reduced to an extremely small value, the inner capacity of the heat sensitive cylinder increases, so that the wax pressure decreases. Consequently, it is possible to reduce the thickness of the cylinder, which causes the inner capacity to be further increased. Therefore, the wax pressure can be reduced in the inverse proportion to the square of the diameter of the rod by increasing the diameter. Thus, it is possible to further reduce the upper limit temperature 81° C. of the coolant temperature.

Furthermore, if a thermostat having wax X line (FIG. 1) which is melted at 69° C. is used, the upper limit temperature decreases to 78° C.

In accordance with the present invention, the cooling fan 33 is provided to be started at a coolant temperature of 81° C. or less. To this end, a cooling fan switch is provided in the cooling system of the engine.

Figure 9A:
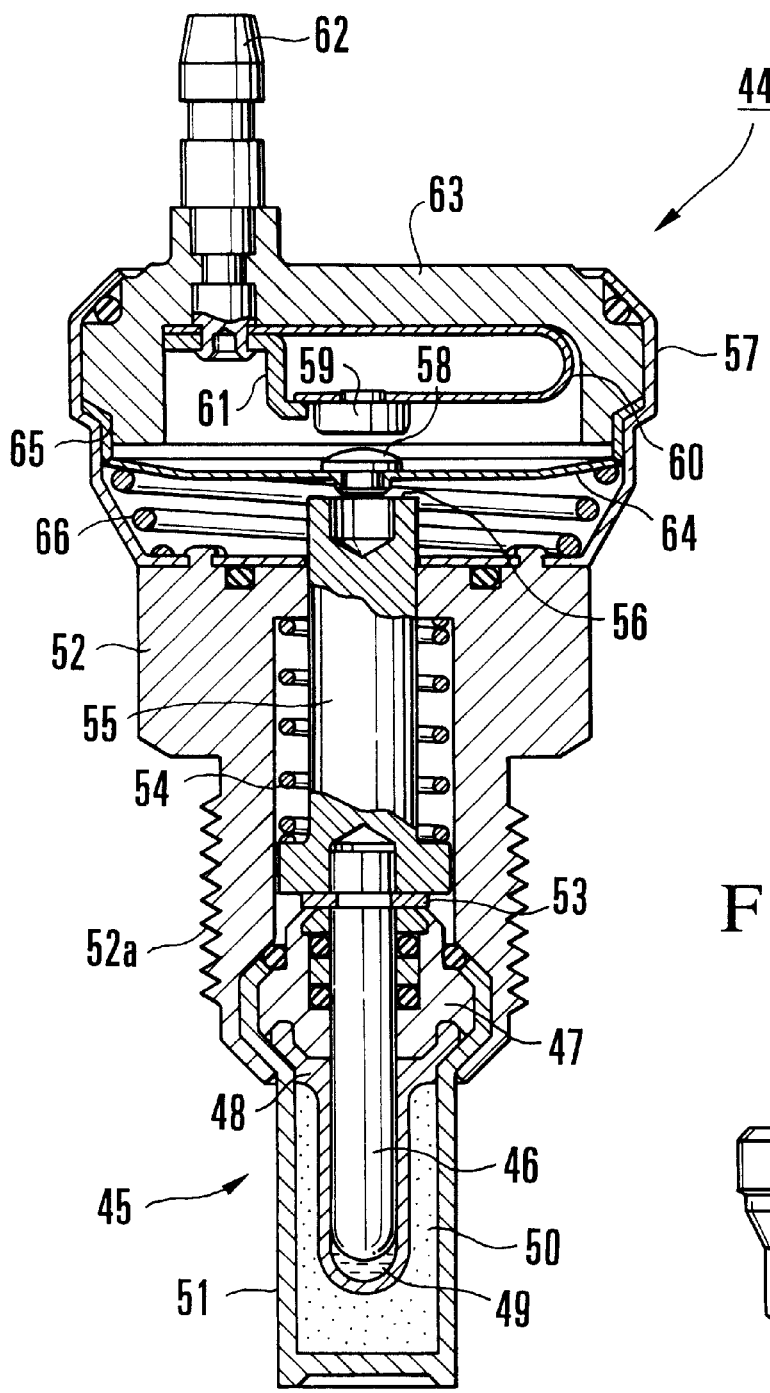
FIG. 9a is a sectional view of a cooling fan switch.
Figure 9B:
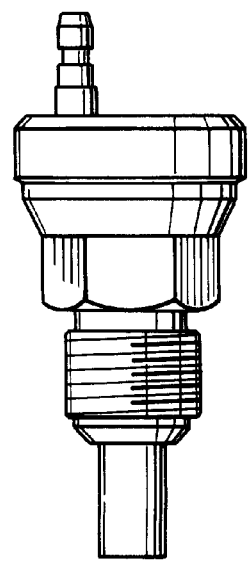
FIG. 9b shows a side view showing the cooling fan switch of FIG. 9a at full-size.

FIG. 9a is a sectional view of a cooling fan switch, and FIG. 9b shows a side view showing the cooling fan switch of FIG. 9a at full-scale.

The cooling fan switch 44 is attached to a thermo-actuator 45 of a small size. The thermo-actuator 45 comprises a rod 46, a guide member 47 slidably mounted on the rod 46. A seal spool 48 is slidably engaged with the rod 46, and secured to the guide member 47. A lubricant oil 49 fills in the space between the seal spool 48 and the rod 46. These three parts are assembled and inserted in a heat sensitive cylinder 51 filled with wax pellets 50. An end of the cylinder 51 is securely and hermetically engaged with the guide member 47 and inserted in a body 52 and secured thereto, thereby forming the thermo-actuator 45.

A stopper ring 53 is engaged in an annular groove formed in the rod 46 at an upper portion thereof. A push rod 55 is engaged with the rod 46 at a lower end portion thereof, and a return spring 54 is provided between a flange of the push rod 55 and an inside wall of the body 52, thereby abutting the underside of the flange against the stopper ring 53.

The push rod 55 is slidably engaged in a center hole of the body 52, and an upper portion of the push rod is projected from the body 52.

The cooling fan switch 44 comprises an insulation body 63 provided with a plus terminal 62 securely mounted in a case 57. A U-shaped conductive plate 60 made of phosphor bronze, electrically connected to the plus terminal 62 and elastically held by a chin of a stopper 61. A fixed contact 59 is fixed to the conductive plate 60. A movable contact 58 is fixed to a snap disk 64 made of phosphor bronze so as to confront the fixed contact 59. The snap disk 64 is curved so as to snap act. A peripheral portion of the snap disk 64 is secured to the case 57 by a stop ring 65 and a spring 66. An upper portion of the case 57 is pressed against the insulation body 63, thereby forming the snap action switch 44.

When the temperature of the coolant rises, the wax 50 in the heat sensitive cylinder 51 expands. This forces the seal spool 48 against the rod 46, so that the rod is upwardly moved. Thus, the push rod 55 is raised against the spring 54, and hence the top 56 of the push rod 55 pushes the movable contact 58 to contact with the fixed contact 59, thereby closing the snap switch.

When the coolant temperature decreases, the wax 50 in the heat sensitive cylinder 51 contracts. Thus, the coil spring 54 causes the push rod 55 to downwardly move. Thus, the movable contact 58 is detached from the fixed contact 59 to open the switch.

The cooling fan switch 44 is attached to a wall of a coolant passage at a proper position by a screw thread 52a, so that the heat sensitive cylinder 51 is immersed in the coolant. Thus, the movable contact 58 is grounded. The plus terminal 62 is connected to a plus terminal of the cooling fan motor 76 (FIG. 12). Therefore, when the coolant temperature reaches 75.5° C., the cooling fan is started.

Figure 10:
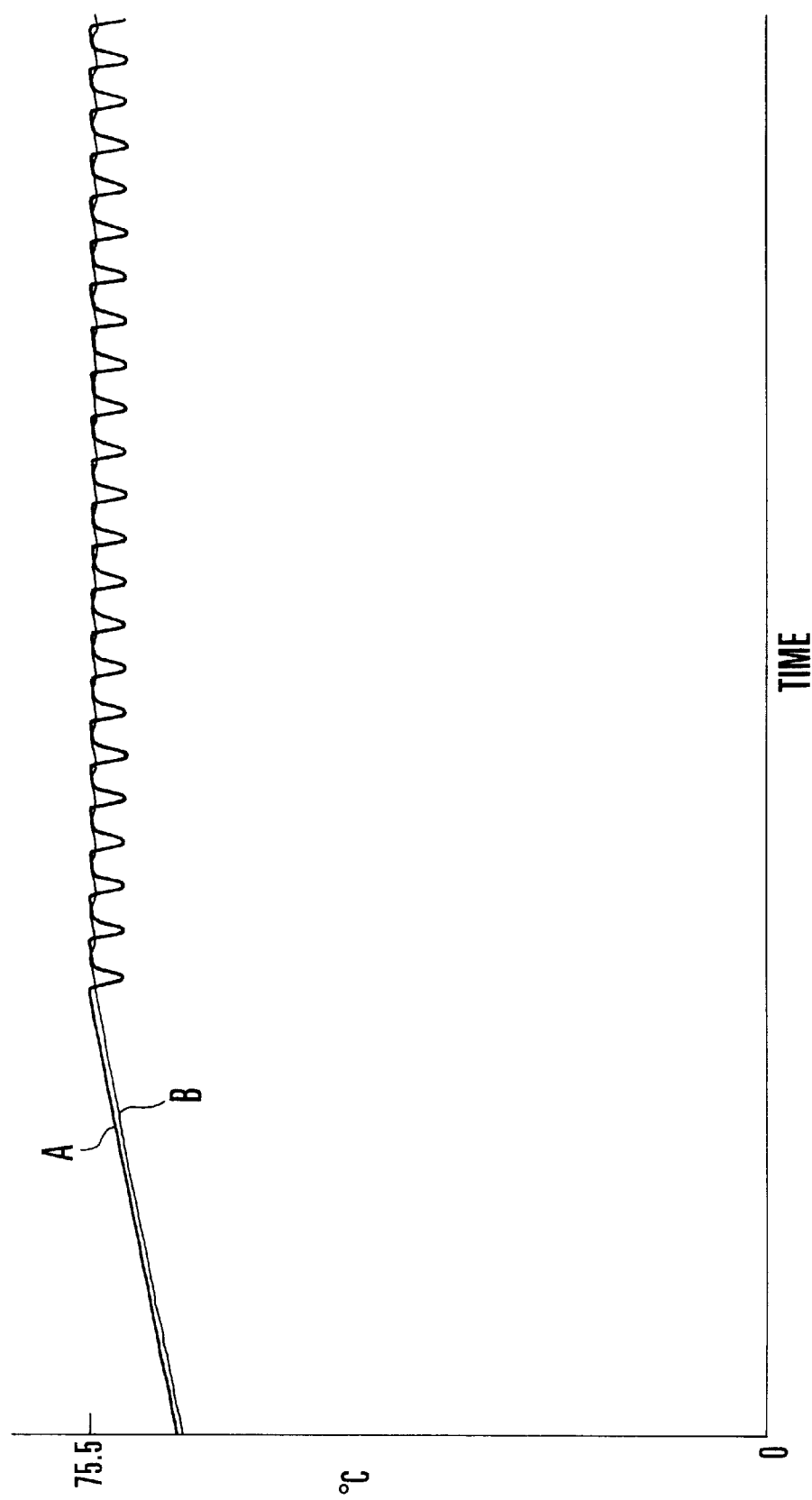
FIG. 10 is a graph showing the change of the coolant temperature with respect to the elapsed time.

FIG. 10 is a diagram showing the change of the coolant temperature with respect to the elapsed time. When the coolant temperature A (at A' of FIG. 12) reaches 75.5° C., the cooling fan switch is closed so that the cooling fan is started. Therefore the coolant temperature reduces and rises, and hence, the temperature cyclically changes at a constant amplitude between 75.5° C. and a lower temperature as shown in the diagram. The temperature does not exceed 75.5° C. The temperature B is held at about 75.5° C.

At the time when the cooling fan switch 44 is closed, the cooling fan continues to rotate by the inertia thereof. Therefore, the torque for starting the motor is very small, which results in reduction of vibration and noises.

Figure 11A:
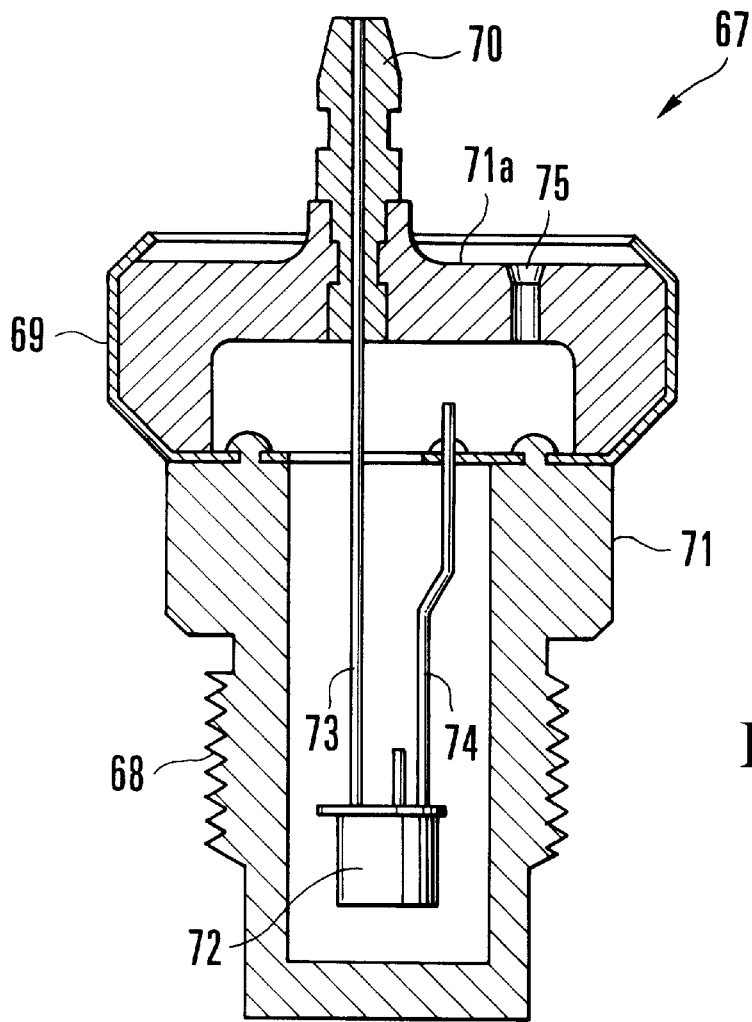
FIG. 11a is a sectional view of an IC cooling fan switch.
Figure 11B:
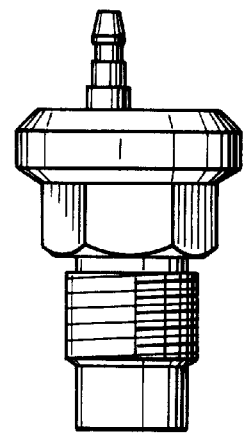
FIG. 11b is a side view of the switch at full size.

FIG. 11a is a sectional view of an IC cooling fan switch 67 with a thermo sensor 72, and FIG. 11b is a side view of the switch at full-scale. The IC cooling fan switch 67 comprises a body 71, case 69 and plus terminal 70 secured to the insulation body 71a. In the body 71, an IC thermo sensor 72 is provided. A plus terminal 73 of the sensor 72 is connected to the plus terminal 70, and a minus terminal 74 is connected to the case 69. Insulation resin such as epoxy resin is poured into the inside of the switch 67 from an opening 75 to solidify the inside parts. The cooling fan switch is also closed at 75.5° C. for example.

Figure 6:
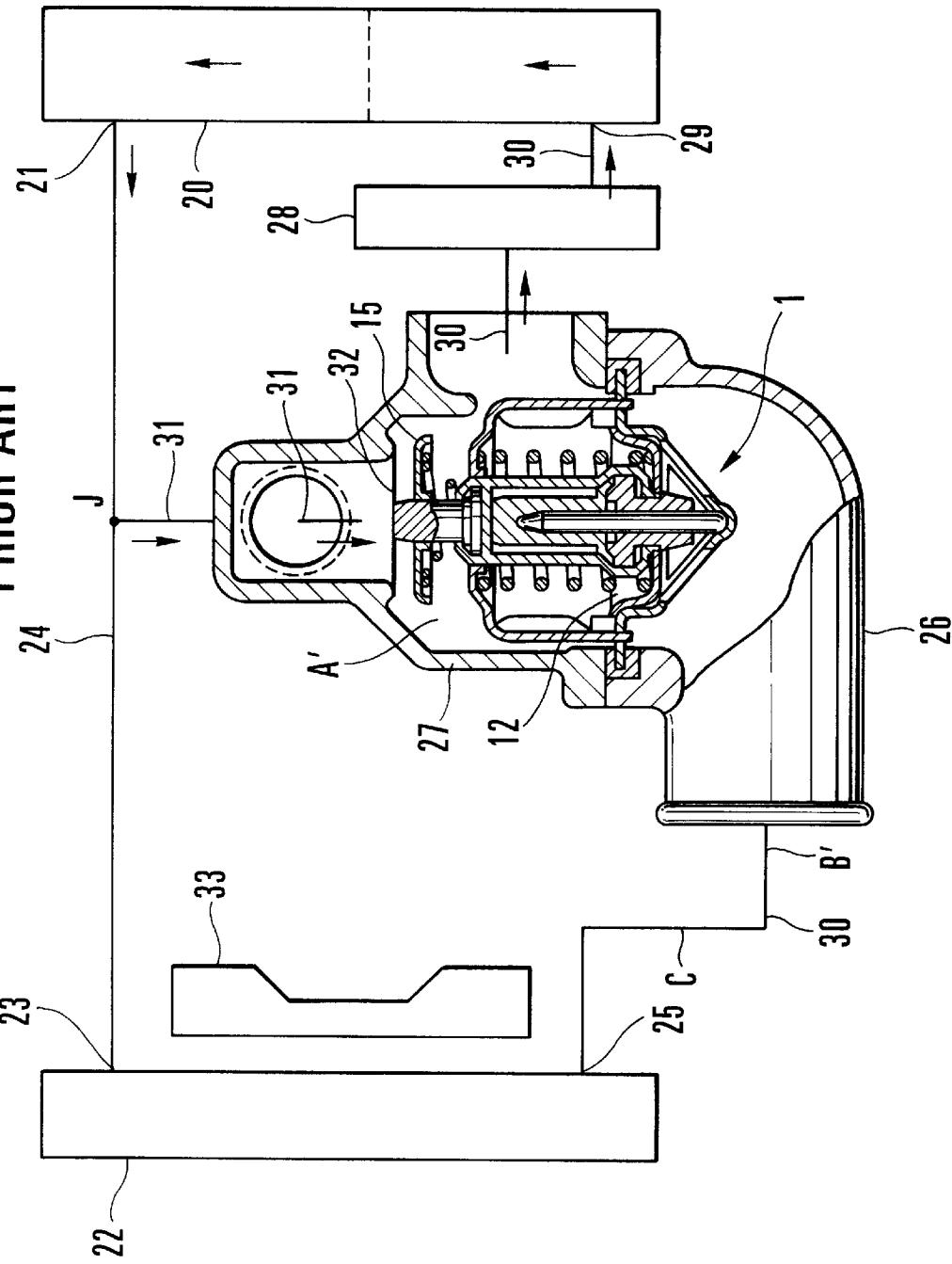
FIG. 6 is a schematic diagram of a conventional cooling system for an automotive engine.
Figure 7:
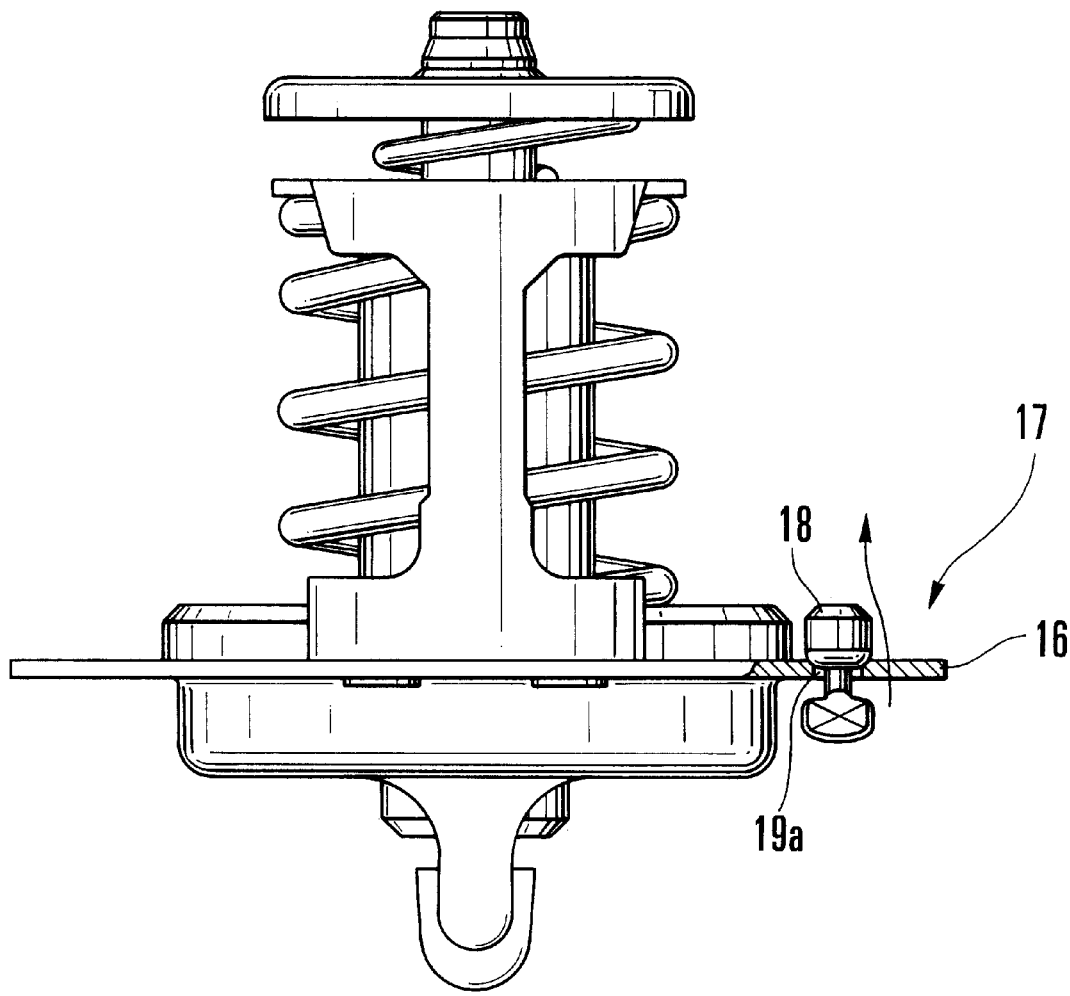
FIG. 7 is a side view of a conventional thermostat.
Figure 8:
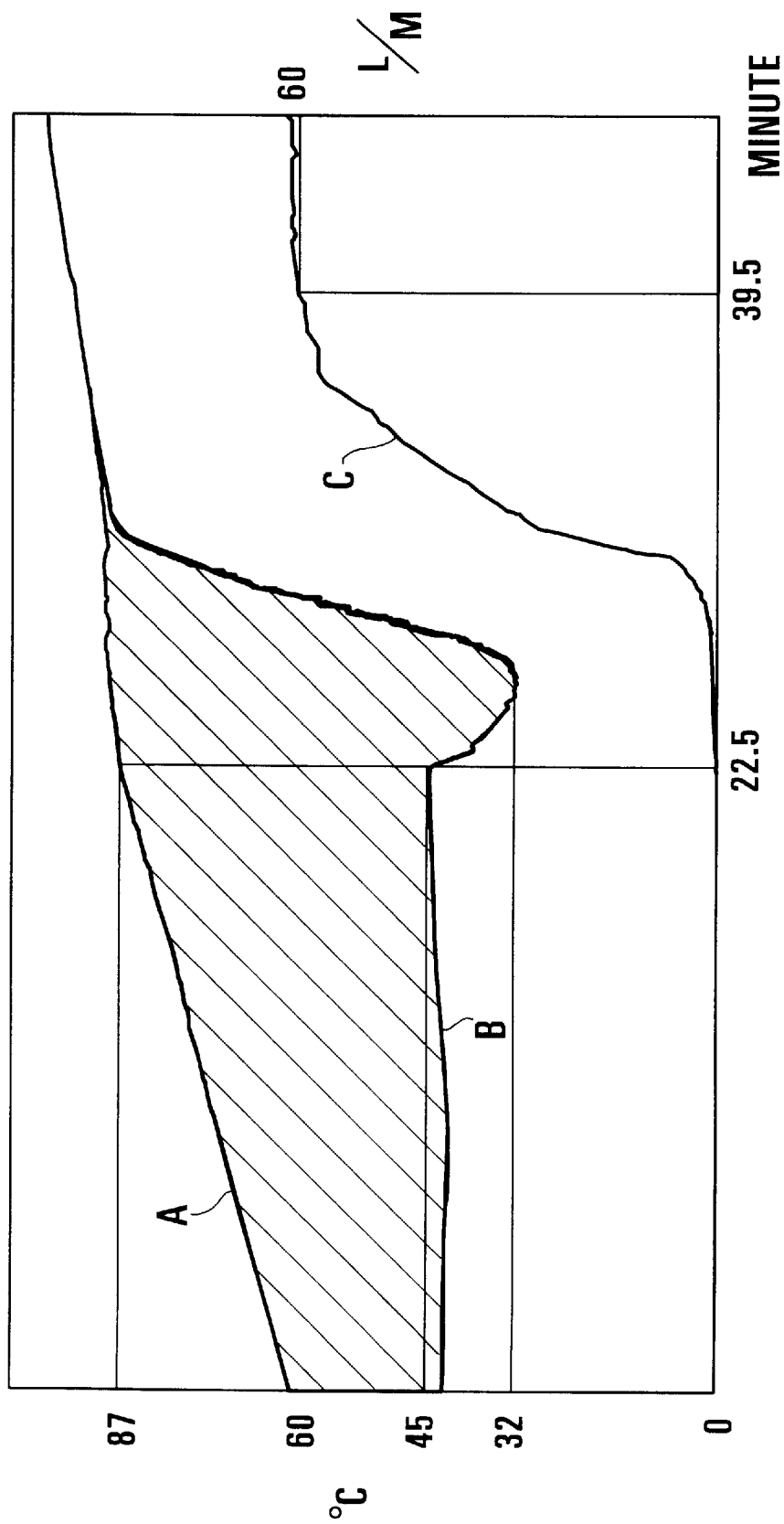
FIG. 8 is a graph showing changes of temperature and flow rate of the coolant of the conventional system with respect to time.

FIG. 12 is a cooling system according to the present invention. The same parts as FIG. 6 are identified as the same reference numerals as those of FIG. 12.

A thermostat cap 26a is made into a structure so as to mount the IC cooling fan switch 67. The switch 67 is securely mounted on the cap 26a by screw thread 68, so that the sensing portion of the switch is located in the cap 26a. The plus terminal 70 is connected to a relay 75. A contact of a relay switch 77 is connected to a drive motor 76 of the cooling fan 33. Thus, when the coolant temperature reaches 75.5° C., the relay switch 77 is closed. Hence the cooling fan 33 is started, and the coolant temperature is held at 75.5° C.

The parts enclosed by a dot-dash line of FIG. 12, such as the water pump 28, fan motor 76, cooling fan 33, thermostat 1 and radiator 22 are assembled into one-set.

The starting temperature of the cooling fan switch is set by such a manner that the starting temperature is lowered by 1° C. step by step, confirming the operation of the cooling system and the engine, and is determined to a temperature in a preferable operating condition.

In accordance with the present invention, by the synergistic effect dependent on the very thin thickness of the seal spool, the small spring constant of the return spring, the thermostat linked to the fan switch, the upper limit of the coolant of the present invention is reduced to 81° C. or lower from 123° C. of the conventional thermostat, so that the fuel consumption of the engine is reduced, the life of the engine is extended, emission of $No_x$ and $CO_2$ is decreased, thereby contributing to the prevention of the global warming.

While the invention has been described in conjunction with preferred specific embodiment thereof, it will be understood that this description is intended to illustrate and not limit the scope of the invention, which is defined by the following claims.

What is claimed is:

1. A cooling system for an automotive engine comprising:
    a radiator for cooling a coolant of the automotive engine;
    a cooling fan driven by a motor for cooling the coolant in the radiator;
    a first coolant passage provided between an outlet of a water jacket of the engine and an inlet of the radiator;
    a second coolant passage provided between an outlet of the radiator and an inlet of the water jacket;
    a bypass passage communicating the first coolant passage and the second coolant passage with each other;
    a housing provided at an intersection of the second coolant passage and the bypass passage;
    a rod secured to the housing;
    a guide member slidably mounted on the rod;
    a resilient seal spool enclosing the rod and hermetically engaged with the guide member at a base portion thereof;
    a lubricant oil sealed in a space between the rod and the seal spool;
    a heat sensitive cylinder enclosing the guide member and the seal spool;
        wax pellets sealed in the heat sensitive cylinder;
        a main valve secured to the guide member so as to close the second coolant passage;
        a bypass valve secured to the heat sensitive cylinder so as to close the bypass passage;
    a flange having a valve seat and secured to the housing;
    a return spring urging the main valve to the valve seat; and
    coolant pressure being applied to inside and outside surfaces of the flange when the main valve closes the second coolant passage;
    wherein;
    the thickness of the seal spool at a portion engaging with the rod is 25% to 5% of the diameter of the rod;
    at least one hole is formed in the flange;
    a cooling fan switch is provided for detecting the temperature of the coolant, and provided to be closed at a predetermined temperature;
    the thickness of the seal spool and the spring constant of the return spring are selected so that the operating of the main valve is within a temperature range in which the wax pellets change from a solid state to a liquid state; and the predetermined temperature for closing the cooling fan switch is set to a value so that an upper limit of the coolant temperature is limited within a range in which the wax pellets change from a solid state to a liquid state.

* * * * *